CIRCUIT BOARD HOLDER

Filed Dec. 28, 1959

INVENTOR.
DENTON W. UNDERHILL
BY Thomas P. Mahoney
ATTORNEY 3,043,587
CIRCUIT BOARD HOLDER Denton W. Underhill, 2054 W. Mountain St., Glendale, Calif.

Filed Dec. 28, 1959, Ser. No. 862,139
10 Claims. (Cl. 269—71)

This invention relates to a circuit board holder and, more particularly, to a circuit board holder adapted to temporarily support such articles as circuit boards while an assembler is soldering or otherwise asesmbling various electronic components thereupon.

While the holder of the invention will be described as being utilized particularly in conjunction with circuit boards, it is, of course, not intended to limit the holder to this particular application since the holder can be utilized to mount various types of articles such as polygonally shaped electrical plugs and the like.

Most electronic devices include a circuit board to which are secured the various electronic components constituting a part of the device. Usually, the components are mounted on the circuit board or electrically secured to each other by a hand operation, such as soldering, or the like. In any event, a wide variety of operations must be performed upon the circuit board and while such operations are being performed it is necessary to mount the circuit board so that the hands of the operator will be free to perform the necessary operations.

It is, therefore, an object of my invention to provide a circuit board holder of the aforementioned character which incorporates a plurality of adjustable supporting members adapted to easily and quickly mount and release a circuit board.

Another object of my invention is the provision of a circuit board holder of the aforementioned character wherein the supporting members are slidably mounted upon an elongated supporting arm and wherein one of the supporting members can be located in a predetermined position of adjustment on said arm while the other of said members can be easily and readily adjusted toward said one member to accomplish the mounting of a circuit board upon said members.

A further object of my invention is the provision of a circuit board holder of the aforementioned character in which the aforesaid arm is secured in a pivoted clamp which is adapted to permit the arm to be rotated about its axis and to be slid longitudinally of the clamp in order to orient the supporting members in predetermined positions of adjustment.

Other objects and advantages of the invention will be apparent from the following specification and the accompanying drawing, which is for the purpose of illustration only, and in which.

Figures 1, 2, 3, 4, 5, 6:
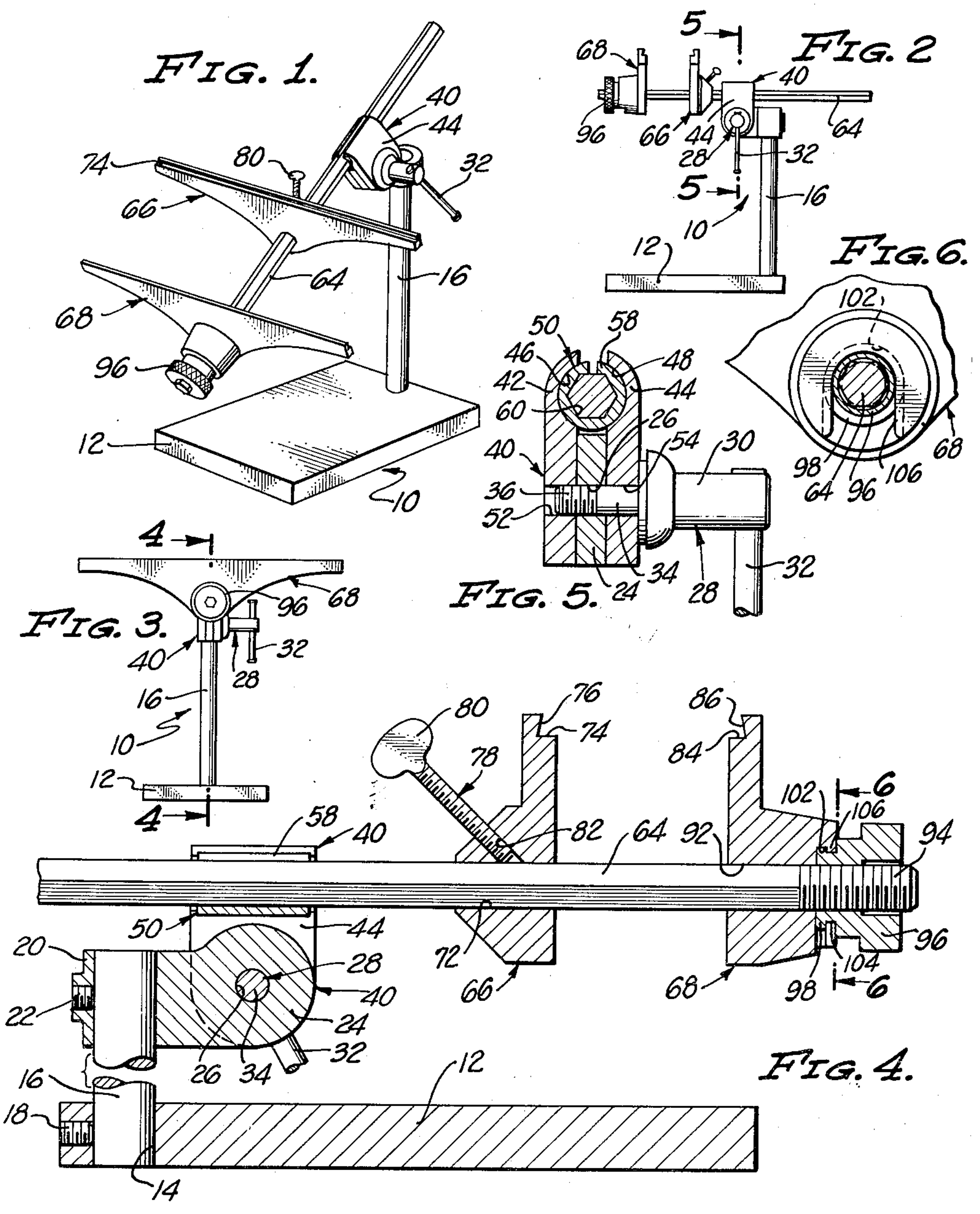
FIG. 1 is a perspective view showing the holder of the invention.
FIG. 2 is a side elevational view of the holder.
FIG. 3 is a front elevational view of the holder.
FIG. 4 is a vertical sectional view taken partially along the broken line 4—4 of FIG. 3.
FIG. 5 is a vertical sectional view taken from the broken line 5—5 of FIG. 2.
FIG. 6 is a vertical sectional view taken on the broken line 6—6 of FIG. 4.

Referring to the drawing, and particularly to FIGS. 1–4 thereof, I show a circuit board holder 10 constructed in accordance with the teachings of the invention and including a substantially rectangular base 12 which is formed, in the present embodiment of the invention, from heavy steel plate to provide sufficient weight to support the holder and circuit boards mounted thereupon in an erect position.

The base 12 incorporates a vertical opening or bore 14 at one extremity thereof, said opening being adapted to receive the lower extremity of a substantially cylindrical standard 16. The lower extremity of the standard 16 is retained in operative engagement with the bore 14 by means of a set screw 18, or similar fastener. Operatively secured to the upper extremity of the standard 16 is a head 20 having a set screw 22 mounted in operative association therewith which retains said head upon the standard.

The head 20 includes a mounting lug 24 which, as best shown in FIGS. 4 and 5 of the drawing, is of rectangular cross section and incorporates a transverse bore 26 therein. A clamp is mounted on the mounting lug 24 by means of an adjustable pivot pin 28 which, as best shown in FIGS. 4 and 5 of the drawing, includes a shank 30 having an actuating handle 32 mounted therein to accomplish rotation of a pivot 34 which has a threaded extremity 36 thereupon.

A clamp 40 is mounted in operative engagement with the mounting lug 24 by means of the pivot pin 28 and includes opposed jaws 42 and 44 which have semi-circular recesses 46 and 48, respectively, at their upper extremities for the reception of a gripping member 50 therebetween. The lower extremity of the jaw 42 incorporates a threaded bore 52 and a corresponding smooth bore 54 is provided in the other jaw 44. The bores 52 and 54 are adapted to receive the pivot 34 and the threaded extremity 36 of said pivot engages the corresponding threaded bore 52 to lock the two jaws 42 and 44 against the contiguous surfaces of the mounting lug 24 of the head 20.

The gripping member 50 is constituted by an elongated split sleeve 58 which has a semi-circular perimeter adapted to be received in the corresponding semi-circular recesses 46 and 48 in the jaws 42 and 44. The bore 60 of the sleeve 58 is polygonal and adapted to receive a correspondingly polygonal arm 64 which is mounted between its extremities in the clamp 40 through the medium of the sleeve 58.

Therefore, when the pivot pin 28 is released by partially unthreading the threaded extremity 36 of the pivot 34 from the threaded bore 52 of the jaw 42, the jaws 42 and 44 are loosened to relieve the pressure on the split sleeve 58 and thus permit the arm 64 to be slid longitudinally in the clamp 40 while also permitting pivotal movement of the clamp with reference to the mounting lug 24. After longitudinal adjustment of the arm 64 and pivotal adjustment of the clamp 40 are accomplished, the pivot 34 can be tightened by rotation of the shank 30 through the handle 32.

Mounted upon the arm 64 are first and second supporting members 66 and 68, respectively. The first supporting member 66 incorporates a polygonal bore 72 corresponding to the external configuration of the arm 64 and thus, while the first supporting member 66 can be slid along the arm 64, it cannot be rotated relative to the arm 64. The first supporting member 66 has a supporting land 74 upon the upper extremity thereof which has an inwardly inclined side wall 76 adapted to grip a circuit board or the like, in a manner to be described in greater detail hereinbelow. Locating means 78 is mounted in the first supporting member 66 and constituted by a thumb screw 80. The locating means 78 is engaged in a threaded bore 82 and is adapted to impinge upon the perimeter of the arm 64 to lock the first supporting member 66 against sliding movement on the arm 64.

The second supporting member 68 incorporates a supporting land 84 upon its upper extremity and said land has an angularly oriented side wall 86 associated therewith. Therefore, when a circuit board, not shown, is disposed upon the lands 74 and 84 and the first and second supporting members 66 and 68 are moved relative to each other to cause the side walls 76 and 86 to grip upon the board, displacement of the board from the first and second supporting members 66 and 68 is prevented.

The second supporting member 68 incorporates a polygonal bore 92 which receives an extremity of the arm 64. A thread 94 is formed upon the extremity of the arm 64 lying within the bore 92 and an adjustment nut 96 is engaged thereupon. The adjustment nut 96 incorporates a collar 98 which is adapted to fit within a corresponding U-shaped receptacle 102 and which defines a recess 104 in the nut adapted to receive a corresponding flange 106 on the second supporting member 68 whereby the nut 96 and the second supporting member 68 are operatively connected to each other.

Therefore, the first supporting member 66 can be located at a predetermined position along the length of the arm 64 in order to space it from the second supporting member 68 a distance approximately equal to that of the dimension of a circuit board which will be placed on the supporting members 66 and 68. Of course, the locating means 78 constituted by the thumb screw 80 maintains the first supporting member 66 in the predetermined position of adjustment. After this has been accomplished, the circuit board can be placed on the lands 74 and 84 of the first and second supporting members 66 and 68, respectively, and the second supporting member 68 adjusted toward the first supporting member 66 by rotation of the nut 96 to lock the side walls 76 and 86 against the contiguous edges of the circuit board and thus maintain it on the first and second supporting members 66 and 68.

The release of the circuit board from operative engagement with the first and second supporting members 66 and 68 is accomplished by the simple rotation of the nut 96 which causes the second supporting member 68 to move away from the first supporting member 66 and release the board. Because of the relatively coarse threads 94, only the slightest rotation of the nut 96 is necessary. Of course, the clamp 40 can be easily released by appropriate rotation of the pivot pin 28 which will permit both the inclination and longitudinal movement of the arm 64. In addition, release of the clamp 40 will also permit relative rotation of the arm in the gripping member 50 with respect to the jaws 42 and 44 of the clamp 40.

Figures 7, 8:
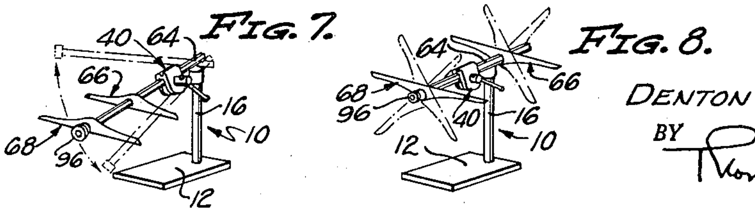
FIG. 7 is a perspective view illustrating the variety of inverted positions which may be assumed by the supporting members of the holder.
FIG. 8 is illustrative of a variety of positions which may be assumed by the supporting members.

Therefore, as best illustrated in FIG. 8 of the drawings, the first and second supporting members 66 and 68 can be rotated into any one of a variety of angular positions to support a circuit board in a desired orientation. Moreover, because of the movable nature of the first supporting member 66, it can be disposed on the opposite side of the clamp 40 from the second supporting member 68. However, the first and second supporting members are usually disposed on the same side of the clamp 40 in the manner shown in FIGS. 1 and 7 of the drawings but the angular inclination of the arm 64 and the orientation of the first and second supporting members 66 and 68 can be adjusted by release of the clamp 40.

I thus provide by my invention a circuit board holder which is characterized by simplicity of construction and ease of operation and which, nevertheless, is capable of orienting a circuit board into a variety of positions. Moreover, because of the relative ease of adjustment of the second supporting member 68 with reference to the first supporting member 66, the circuit board holder 10 can be utilized to quickly mount and as quickly release a circuit board or other electrical or electronic component mounted on the supporting members 66 and 68. The control of the angular, axial and longitudinal orientation of the arm 64 by the clamp 40 greatly facilitates the orientation of the first and second supporting members 66 and 68 by a worker utilizing the circuit board holder.

I claim:

1. In a circuit board holder, the combination of: a base, a standard on said base, a clamp supported upon said standard; an elongated arm mounted in said clamp and longitudinally shiftable therein; a first supporting member slidably mounted on said arm intermediate the extremities thereof, said first supporting member having locating means thereupon adapted to impinge on the perimeter of said arm to locate said first supporting member in a predetermined position with respect to said arm; a second supporting member mounted adjacent one extremity of said arm and co-operative with said first supporting member for holding an object therebetween; and an adjustment member mutually secured to said second supporting member and one extremity of said arm for adjusting said second supporting member with respect to said first supporting member.

2. In a circuit board holder, the combination of: a base; a standard on said base; a clamp pivotally mounted on said standard, said clamp having opposed clamping jaws and a clamping member located between said jaws; an elongated arm mounted in said clamping member of said clamp and longitudinally shiftable therein; a first supporting member slidably mounted on said arm intermediate the extremities thereof, said first supporting member having locating means thereupon adapted to impinge on the perimeter of said arm to locate said first supporting member in a predetermined position with respect to said arm; a second supporting member mounted adjacent one extremity of said arm and co-operative with said first supporting member for holding an object therebetween; and an adjustment member mutually secured to said second supporting member and one extremity of said arm for adjusting said second supporting member with respect to said first supporting member.

3. In a circuit board holder, the combination of: a base; a standard on said base; a clamp supported upon said standard; an elongated arm mounted in said clamp, said arm having a threaded extremity thereupon; a first supporting member slidably mounted on said arm intermediate the extremities thereof, said first supporting member having locating means thereupon adapted to impinge on the perimeter of said arm to locate said first supporting member in a predetermined position with respect to said arm; a second supporting member mounted adjacent said threaded extremity of said arm and co-operative with said first supporting member for holding an object therebetween; and an adjustment member mutually secured to said threaded extremity of said arm and said second supporting member for adjusting said second supporting member with respect to said first supporting member.

4. In a work support, the combination of: a base; a standard on said base; a head on said standard; a locking pivot pin mounted on said head; a clamp supported on said locking pivot pin and movable with reference to said head upon release of said pivot pin; an elongated arm mounted in said clamp and longitudinally shiftable therein; a first supporting member slidably mounted on said arm; locating means on said first supporting member engageable with said arm for locating said first supporting member in a predetermined position on said arm; a second supporting member co-operative with said first supporting member mounted adjacent one extremity of said arm; and adjustment means mutually secured to said extremity of said arm and said second supporting member for adjusting said second supporting member on said arm and in reference to said first supporting member.

5. In a work support, the combination of: a base; a standard on said base; a head on said standard; a locking pivot pin mounted on said head; a clamp supported on said locking pivot pin and movable with reference to said head upon release of said pivot pin; an elongated polygonal arm mounted in said clamp; a first supporting member slidably mounted on said arm, said first supporting member having a polygonal bore adapted to receive said arm and prevent relative rotation between said first supporting member and said arm; locating means on said first supporting member engageable with said arm for locating said first supporting member in a predetermined position on said arm; a second supporting member co-operative with said first supporting member mounted adjacent one extremity of said arm, said second supporting member having a polygonal bore therein adapted to receive said arm and to prevent relative rotation between said second supporting member and said arm; and adjustment means mutually engageable upon said extremity of said arm and said second supporting member for adjusting said second supporting member on said arm and in reference to said first supporting member.

6. In a work support, the combination of: a base; a standard on said base; a clamp pivotally mounted on said standard, said clamp being adjustable to release or engage the same; an elongated arm mounted in said clamp and adapted to be longitudinally shifted in respect thereto upon release thereof and to be locked in position by said clamp when said clamp is engaged; a first supporting member slidably mounted on said arm; locating means for locating said first supporting member in a predetermined position on said arm; a second supporting member mounted on said arm for co-operation with said first supporting member; and adjustment means threadedly engaged on said arm and with said second supporting member for adjusting said second supporting member in reference to said arm and said first supporting member.

7. In a work support, the combination of: a base; a standard on said base; a clamp pivotally mounted on said standard, said clamp being adjustable to release or engage the same; an elongated polygonal arm mounted in said clamp and adapted to be longitudinally shifted in respect thereto upon release thereof and to be locked in position by said clamp when said clamp is engaged; a first supporting member slidably mounted on said arm and having a polygonal bore for the reception of said arm; locating means for locating said first supporting member in a predetermined position on said arm; a second supporting member having a polygonal bore for the reception of said arm for co-operation with said first supporting member; and adjustment means threadedly engaged on said arm and with said second supporting member for adjusting said second supporting member in reference to said arm and said first supporting member.

8. In a work support, the combination of: a base; a standard on said base; a head on said standard, said head having an integral mounting lug thereupon; a clamp mounted on said mounting lug and including opposed jaws disposable on opposite sides of said lug, said clamp having a gripping member disposed between said jaws; a pivot pin engageable with said clamp and said mounting lug to support said clamp on said lug and adjust said gripping member; an elongated arm mounted in said gripping member; a first supporting member slidably mounted on said arm; locating means engageable with said first supporting member and said arm for positioning said first supporting member on said arm; a second supporting member mounted on said arm and co-operative with said first supporting member; and adjustment means mutually engageable with said arm and said second supporting member to adjust said second suporting member with reference to said first supporting member.

9. In a work support, the combination of: a base; a standard on said base; a clamp on said standard; an elongated arm slidably mounted on said clamp, said elongated arm having a threaded extremity thereupon; a first supporting member slidably mounted on said arm and having locating means adapted to lock said first supporting member in a predetermined position on said arm; a second supporting member mounted on said arm adjacent said threaded extremity thereof; and an adjustment nut engageable upon said threaded extremity and rotatably secured to said second supporting member whereby said second supporting member may be adjusted toward or away from said first supporting member.

10. In a work support, the combination of: a base; a standard on said base; a clamp on said standard, said clamp having a pair of clamping jaws and a gripping member disposed between said jaws and compressible thereby; an elongated arm slidably mounted in said gripping member of said clamp, said elongated arm having a threaded extremity; a first supporting member slidably mounted on said arm and having locating means adapted to lock said first supporting member in a predetermined position on said arm; a second supporting member mounted on said arm adjacent said threaded extremity thereof; and an adjustment nut engageable upon said threaded extremity and rotatably secured to said second supporting member whereby said second supporting member may be adjusted toward or away from said first supporting member.

References Cited in the file of this patent

UNITED STATES PATENTS

| | | |
|---|---|---|
| 665,398 | Broadbrooks | Jan. 8, 1901 |
| 2,310,276 | Bilz | Feb. 9, 1943 |
| 2,506,440 | Carlson | May 2, 1950 |
| 2,733,035 | Rocheleau | Jan. 31, 1956 |